United States Patent [19]

Washer et al.

[11] Patent Number: 4,616,669
[45] Date of Patent: Oct. 14, 1986

[54] MIXING FLUIDS

[75] Inventors: Stone P. Washer; Bruce A. Bush, both of Bartlesville, Okla.

[73] Assignee: Phillips Petroleum Company, Bartlesville, Okla.

[21] Appl. No.: 720,929

[22] Filed: Apr. 8, 1985

[51] Int. Cl.⁴ .................................. B65G 65/30
[52] U.S. Cl. ..................... 137/1; 137/154; 405/59
[58] Field of Search ............ 137/154, 209, 1, 8; 405/53, 59

[56] References Cited

U.S. PATENT DOCUMENTS

| 2,998,016 | 8/1961 | Bottenberg et al. | 137/8 |
| 3,027,901 | 4/1962 | Bottenberg et al. | 137/8 |
| 3,049,921 | 8/1962 | Shiver | 73/302 |
| 3,056,265 | 10/1962 | Swinney | 61/5 |
| 4,117,684 | 10/1978 | Hendrix | 405/54 |

Primary Examiner—Alan Cohan
Attorney, Agent, or Firm—A. W. Umphlett

[57] ABSTRACT

A method for mixing hydrocarbons in a underground storage cavern using immiscible fluids is disclosed.

11 Claims, 2 Drawing Figures

MIXING FLUIDS

This invention relates to the mixing of fluids. It also relates to the storage of fluids in underground storage caverns. In one aspect of the invention it relates to a process for mixing fluids in underground storage caverns. In a specific aspect of the invention it relates to the mixing of hydrocarbons using an immiscible fluid.

BACKGROUND OF THE INVENTION

Underground storage caverns such as the one described in U.S. Pat. No. 3,049,921 are well known in the art. These storage caverns have proved to be an inexpensive alternative to surface storage equipment such as steel tanks. The caverns also require little maintenance and can be much larger than surface storage equipment.

These underground storage caverns are generally formed in impermeable earth formations either by conventional mining methods, or in some cases, by dissolving the materials with aqueous solvents or the like, to create a storage space in the soluble underground formation. Often salt formations or salt domes are used to create these storage spaces. After formation of the cavern a pool of brine or other fluid which is immiscible with desired stored fluid will be introduced into the lower portion of the cavern and the product to be stored will occupies the space in the upper portion of the cavern over the heavier immiscible fluid.

This immiscible fluid is generally used as a displacing fluid. The fluid is pumped into the lower portion of the cavern so that the stored product can be removed from the upper portion.

A problem that arises with storage caverns is that it is sometimes necessary to mix the product fluids in the caverns. The caverns, however, are often too large to utilize conventional mixing techniques. For example, when storing hydrocarbons, it often happens that the fluids stored over a period of time will vary in density, so that the fluids stratify. When this happens, each layer of fluid will have different properties, such as boiling point, viscosity, etc. To use these fluids in shipping a product to a customer or in various processes, such as fractination, it is necessary that the fluids be mixed to provide a uniform fluid. Conventional mixing has not been effective in providing a uniform mixture without a large investment put into large mixers.

The object of this invention is to provide a uniform mixture of fluids in a storage cavern so that the fluids will be easy to process. A second object is to provide an economical mixing system.

SUMMARY OF INVENTION

According to the instant invention, fluids, such as hydrocarbons, of various densities and qualities, are mixed together through the use of an immiscible fluid of heavier density. In the preferred embodiment of this invention, hydrocarbon fluids are stored over the immiscible fluids in an underground cavern. The immiscible fluids are brought up through a conduit to a point above the underground cavern and mixed with the hydrocarbon fluid. This mixture is then returned to the underground cavern through an annulus surrounding the conduit. The immiscible fluid so dispersed in the hydrocarbon provides the agitation for the hydrocarbon fluid as the immiscible fluid settles to the lower portion of the underground cavern.

In another embodiment, the immiscible fluid is pumped up from the lower portion and then is caused to enter and settle through the fluid to the bottom of the cavern providing mixing to the fluid. In the case of hydrocarbons, once the fluids are mixed they will not restratify.

DETAILED DESCRIPTION OF THE INVENTION

Although hydrocarbons are the preferred fluid, any fluid that needs to be stored that would also require mixing to be made uniform is applicable to this invention. Likewise, any heavier immiscible fluid can be used as the mixing agent.

This invention is also not limited to a underground storage cavern, as any large storage means, where conventional mixing is either expensive or impractical, can utilize this invention. This invention is particularly applicable to underground storage caverns where no conventional mixing means are practical.

Figure 1:
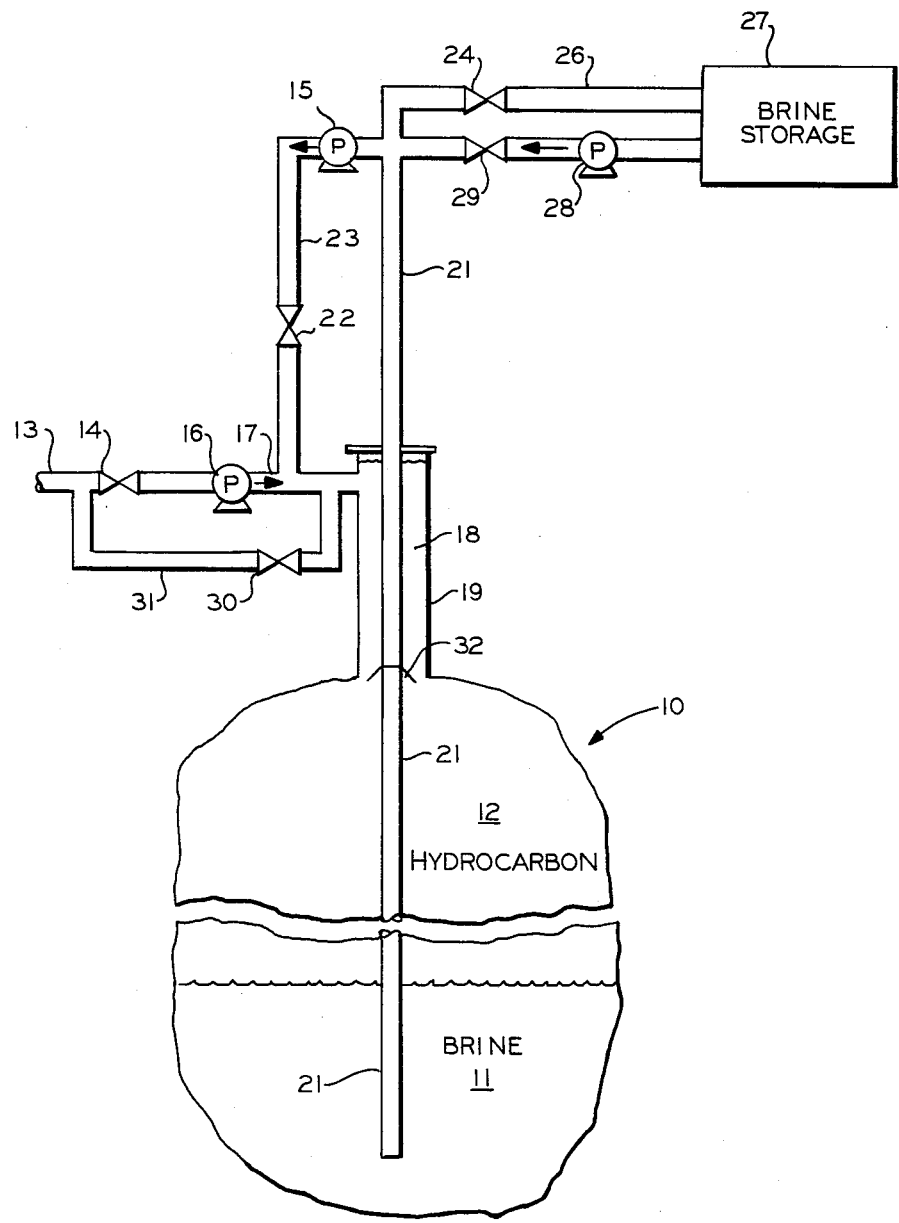
FIG. 1 shows a schematic diagram of the preferred embodiment of this invention.

Please refer to FIG. 1. In normal operation, when hydrocarbons, such as gasoline, are to be stored in an underground (salt) storage cavern, valves 29, 30, 22 are closed, and pumps 15 and 28 are shut down; and valves 14 and 24 are open, and pump 16 flows hydrocarbons via conduit 13, valve 14, and conduit 17 via annulus 18, formed by conduit 19, into the hydrocarbon mass 12 in cavern 10. As the hydrocarbons enter the cavern, brine 11 passes via conduit 21 and valve 24 into brine storage 27. When the hydrocarbon transfer is completed, pump 16 is shut down and the open valves 14 and 24 are closed.

When hydrocarbons are delivered from the cavern for usage, e.g., in a fractionation process, valves 14, 22, and 24 are closed with pumps 15 and 16 shut down, and valves 29, and 30 are open, and pump 28 is on to flow brine from storage 27 via pump 28, valve 29, and conduit 21 into the brine mass 11 in cavern 10. The incoming brine forces the hydrocarbons 12 through annulus 18, open valve 30 and conduits 31 and 13 to usage. When the desired amount of hydrocarbons has been removed from the cavern, pump 28 is shut down, and valves 29 and 30 are closed.

When employing our invention to effect mixing of different quality hydrocarbons (e.g. gasolines of different gravities, boiling ranges, etc.) so that the hydrocarbon mass will be of a constant quality, brine is circulated both during filling of the cavern with the hydrocarbons and/or after the hydrocarbons have been added to the cavern. This is required when the hydrocarbons are charged to a fractionation process so that constant operation of the fractionation process can be effected.

Generally, a cavern such as this receives hydrocarbons at various times and the hydrocarbons received are not from the same source, and they vary therefore in quality (boiling range, gravity, etc.). Stratification, then, will occur in the cavern in the hydrocarbon phase. In order to have efficient operation of fractionation to which the hydrocarbons are charged, the hydrocarbon mass must be mixed to produce constant quality hydrocarbons. This mixing is effected by our invention.

When mixing during filling the cavern with hydrocarbons, in accordance with our invention, as shown in FIG. 1, valves 29 and 30 are closed, and pump 28 is shut down. The hydrocarbons flow via conduit 13, valve 14, pump 16, and conduit 17, into annulus 18 and down into the cavern 10. At the same time, the brine is being forced from the cavern via conduit 21. The brine passes via pump 15, conduit 23 and valve 22 and is admixed with the hydrocarbons flowing down annulus 18. The admixture can be deflected by optional means 32. The hydrocarbons then accumulate in the hydrocarbon mass 12 effecting the desired mixing of the newly added hydrocarbons with the hydrocarbons already in the cavern to produce a uniform quality of stored hydrocarbons. The brine ultimately is collected in the brine mass 11, with circulation via conduit 21. Part of the displaced brine, equal to about that volume of hydrocarbon added to the cavern, flows via valves 24 and conduit 26 into brine storage 27. When the filling with hydrocarbons has finished, the valves now open are shut and pumps 15 and 16 are shut down.

When hydrocarbons are not being added to the cavern, but mixing of the hydrocarbon mass 12 is required, the mixing is also effected by our invention. Valves 14, 29, and 30 are closed, and pumps 16 and 28 are shut down. Valves 22 and 24 are open and pump 15 is turned on. Brine flows via pump 15, conduit 23, and annulus 18 into the cavern, flowing over optional deflector 32, and falling as separated streams and masses through the hydrocarbon mass 12, therey effecting desired mixing of mass 12 to produce a constant quality of stored hydrocarbons. The dense brine ultimately is collected in a brine mass 11 and then flows upwardly via conduit 21 for recirculation via pump 15.

When the mixing is finished, the pump 15 is shut down and now-open valves 24 and 22 are closed.

When, in accordance with our invention, brine is circulated for mixing during the addition of hydrocarbon to the cavern, the volume ratio of hydrocarbon to brine can be in the range of about 10 to 1 to about 1 to 2. Normally, about 1 to 1 will be used for desired mixing of the hydrocarbon mass 12.

Figure 2:
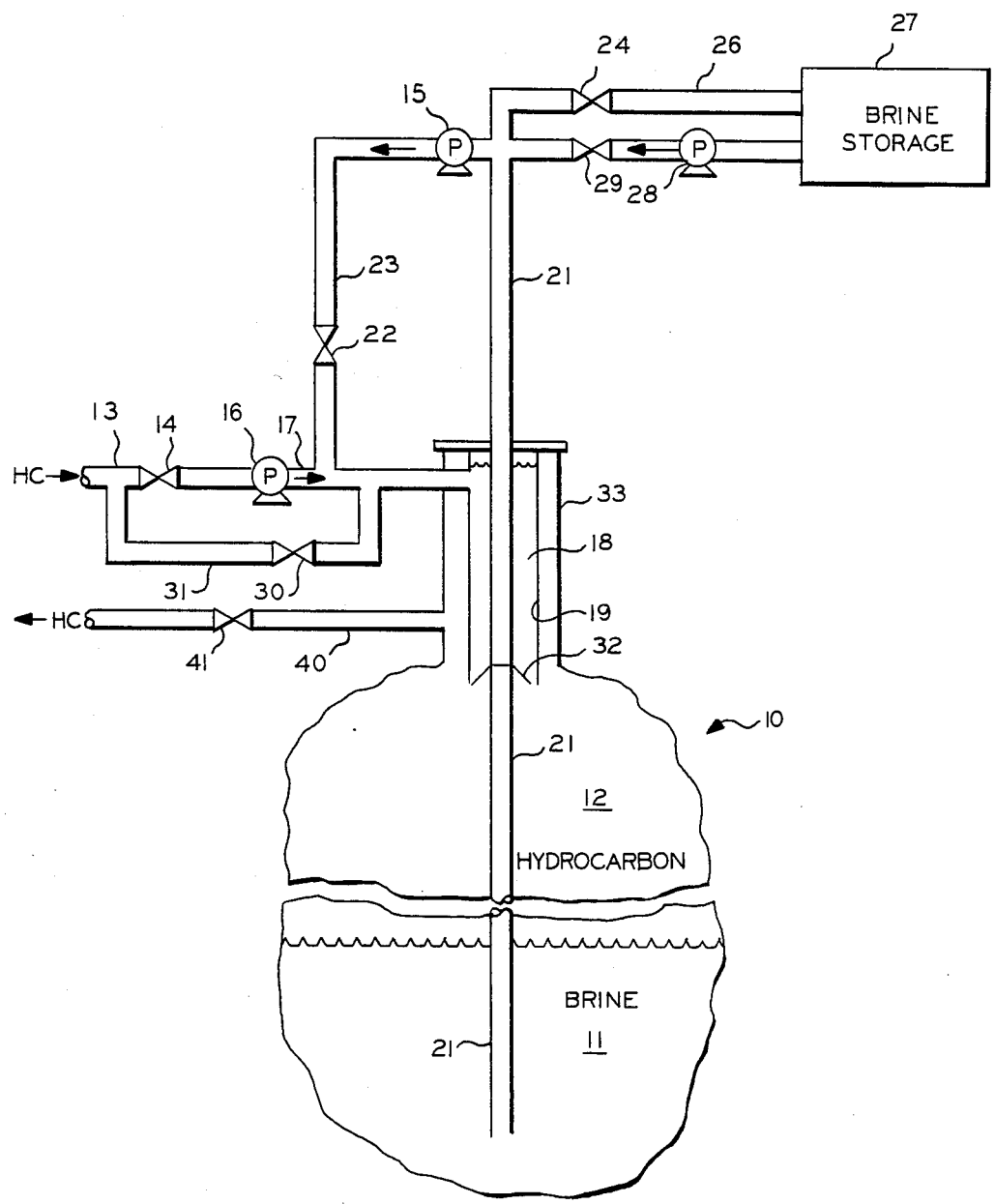
FIG. 2 shows a schematic diagram of another embodiment of this invention.

In another embodiment, a second annulus can be present as in FIG. 2. In this embodiment a first pipe extends into the cavern into the brine as in the first embodiment, line 21. A first annulus 19 is then present for introducing mixtures of brine and hydrocarbon. A second annulus 33 is also present for removing hydrocarbons from the upper portion of the cavern through line 40 and valve 41. This embodiment allows removal of hydrocarbons while introducing brine/hydrocarbon mixtures.

Other embodiments are also possible within the scope of this invention and this invention is not intended to be limited by the embodiments set forth here. For instance, the immiscible fluid can be flowed through the desired fluid in any conventional manner such as spraying, sparging, pouring, etc.

We claim:

1. A method for mixing stored fluids in an underground storage covern in which said fluids are stored over heavier immiscible fluids comprising admixing said immiscible fluids with said stored fluids by forcing said immiscible fluids from the lower portion of said cavern to the upper portion of said cavern where said immiscible fluid flows through said stored fluids and returns to the lower portion of said cavern.

2. A method according to claim 1 where the stored fluids are also introduced into the upper portion of said cavern while said immiscible fluid is being introduced in to the upper portion of said cavern.

3. A method according to claim 2 where said stored fluids are hydrocarbons.

4. A method according to claim 3 where said hydrocarbons are gasolines.

5. A method according to claim 4 where said immiscible fluid is brine.

6. A method according to claim 2 where stored fluid is removed from said cavern while said stored fluid and said immiscible fluid are being introduced into said cavern.

7. A fluid storage means comprising an underground cavern, means for injecting and withdrawing stored fluid in the upper portion of said cavern, a means for injecting and withdrawing heavier, immiscible fluids in a lower portion of said cavern, a means for injecting said immiscible fluid into the upper portion of said cavern and separate means for withdrawing fluid from said upper portion of said cavern while said immiscible liquid is injected into the upper portion of said cavern.

8. A fluid storage means as in claim 7 where said means for withdrawing and injecting said stored fluid is an annular means, concentric with said means for injecting and withdrawing said immiscible fluid.

9. A fluid storage means as in claim 7 wherein a means is provided to admix said stored fluid and said immiscible fluid on the surface above said underground cavern in cooperation with a means for injecting said mixture into the upper portion of said cavern.

10. A fluid storage means as in claim 9 where a separate means is provided for withdrawing fluid from said upper portion of said cavern while said mixture is injected into the upper portion of said cavern.

11. A fluid storage means as in claim 10 where said means provided to withdraw said stored fluid is an annular means.

* * * * *